(12) United States Patent
Ikonomov

(10) Patent No.: US 10,115,084 B2
(45) Date of Patent: Oct. 30, 2018

(54) ELECTRONIC PAYMENT SYSTEM

(71) Applicant: Artashes Valeryevich Ikonomov, Moscow (RU)

(72) Inventor: Artashes Valeryevich Ikonomov, Moscow (RU)

( * ) Notice: Subject to any disclaimer, the term of this patent is extended or adjusted under 35 U.S.C. 154(b) by 753 days.

(21) Appl. No.: 14/434,441

(22) PCT Filed: Sep. 24, 2013

(86) PCT No.: PCT/RU2013/000828
§ 371 (c)(1),
(2) Date: Apr. 9, 2015

(87) PCT Pub. No.: WO2014/058349
PCT Pub. Date: Apr. 17, 2014

(65) Prior Publication Data
US 2015/0269540 A1    Sep. 24, 2015

(30) Foreign Application Priority Data
Oct. 10, 2012   (RU) ................................ 2012143344

(51) Int. Cl.
*G06Q 20/08*    (2012.01)
*G06F 21/31*    (2013.01)
(Continued)

(52) U.S. Cl.
CPC ............ *G06Q 20/08* (2013.01); *G06F 21/31* (2013.01); *G06Q 20/10* (2013.01); *G06Q 20/227* (2013.01); *G06Q 20/382* (2013.01); *G06Q 20/40* (2013.01)

(58) Field of Classification Search
CPC .... G06Q 20/405; G06Q 20/401; G06Q 40/02; G06Q 20/3223
(Continued)

(56) References Cited

U.S. PATENT DOCUMENTS 6,424,819 B1   7/2002  Yan
6,476,830 B1   11/2002 Farmer et al.
(Continued)

FOREIGN PATENT DOCUMENTS

DE   102007049795 A1   8/2008
EP   1343130 A2        9/2003
(Continued)

OTHER PUBLICATIONS

Office Action dated Feb. 27, 2015 in co-pending U.S. Appl. No. 13/774,251 (US20140244736A1) (12 pages).
(Continued)

*Primary Examiner* — Tien C Nguyen
(74) *Attorney, Agent, or Firm* — Westerman, Hattori, Daniels & Adrian, LLP

(57) ABSTRACT

Electronic payment architectures specifically intended for account management systems, and specifically to electronic payment systems include client devices of remote users, with an interface unit for controlling monetary operations and accounts, and are connected to one another with the aid of a unified network, which includes at least one server with, connected to one another, a storage unit for a database of monetary operations and accounts, an authorization and authentication unit, a unit for controlling monetary operations and accounts, and an analysis and statements unit, and can be used by users of computer devices for controlling real and virtual monetary operations and
In accordance with this utility model, the electronic payment system additionally comprises accounts, a unit for creating and keeping an account in real monetary units, and a unit for creating and keeping an account in virtual monetary units, which units are connected to the unit for controlling monetary operations and accounts and to the storage unit.

20 Claims, 1 Drawing Sheet

(51) Int. Cl.
  *G06Q 20/10* (2012.01)
  *G06Q 20/22* (2012.01)
  *G06Q 20/38* (2012.01)
  *G06Q 20/40* (2012.01)

(58) Field of Classification Search
  USPC .......... 705/44, 26, 39, 38, 37; 235/379, 380, 235/493; 455/406, 414.1; 463/25; 713/189; 719/318
  See application file for complete search history.

(56) References Cited

U.S. PATENT DOCUMENTS

| | | | |
|---|---|---|---|
| 6,745,367 B1 | 6/2004 | Bates et al. | |
| 6,934,739 B2 | 8/2005 | Pietilä | |
| 7,120,608 B1 * | 10/2006 | Gallagher | G06Q 20/0855 705/68 |
| 7,208,669 B2 | 4/2007 | Wells et al. | |
| 7,275,095 B1 | 9/2007 | Lebouill | |
| 7,278,921 B1 | 10/2007 | Fujisawa et al. | |
| 7,359,941 B2 | 4/2008 | Doan et al. | |
| 7,686,218 B2 | 3/2010 | Hessburg et al. | |
| D627,790 S | 11/2010 | Chaudhri | |
| 7,908,216 B1 | 3/2011 | Davis et al. | |
| 8,015,116 B2 * | 9/2011 | Crandell | G06F 21/31 705/64 |
| 8,133,116 B1 * | 3/2012 | Kelly | A63F 13/85 463/1 |
| 8,515,870 B2 * | 8/2013 | Oskolkov | G06Q 20/42 705/35 |
| 8,676,661 B2 | 3/2014 | Oikonomidis | |
| 8,732,080 B2 * | 5/2014 | Karim | G06Q 20/10 705/35 |
| 8,851,366 B2 * | 10/2014 | Modi | G06Q 20/02 235/375 |
| 8,965,948 B2 * | 2/2015 | Shimamura | H04L 51/043 709/203 |
| 2002/0034980 A1 | 3/2002 | Lemmons et al. | |
| 2002/0078358 A1 | 6/2002 | Neff et al. | |
| 2003/0117531 A1 | 6/2003 | Rovner et al. | |
| 2003/0124499 A1 | 7/2003 | Kumar et al. | |
| 2003/0200179 A1 | 10/2003 | Kwan | |
| 2014/0171425 A1 | 9/2004 | Misraje et al. | |
| 2004/0199469 A1 | 10/2004 | Barillova et al. | |
| 2005/0027691 A1 | 2/2005 | Brin et al. | |
| 2005/0218224 A1 | 10/2005 | Boldin | |
| 2005/0289079 A1 | 12/2005 | Krishan et al. | |
| 2006/0074883 A1 | 4/2006 | Teevan et al. | |
| 2006/0187193 A1 | 8/2006 | Esquilin | |
| 2007/0167204 A1 | 7/2007 | Lyle et al. | |
| 2007/0244812 A1 | 10/2007 | Turk et al. | |
| 2007/0250793 A1 | 10/2007 | Miura et al. | |
| 2007/0273558 A1 | 11/2007 | Smith et al. | |
| 2008/0077532 A1 | 3/2008 | Von Heesen et al. | |
| 2008/0184122 A1 | 7/2008 | Grant et al. | |
| 2009/0024529 A1 * | 1/2009 | Baig | G06Q 20/02 705/44 |
| 2009/0132423 A1 * | 5/2009 | Liu | G06Q 20/10 705/70 |
| 2009/0177744 A1 | 7/2009 | Marlow et al. | |
| 2009/0216551 A1 | 8/2009 | Chen et al. | |
| 2009/0217342 A1 | 8/2009 | Nadler | |
| 2009/0228322 A1 | 9/2009 | van Os et al. | |
| 2009/0253494 A1 * | 10/2009 | Fitch | A63F 13/12 463/25 |
| 2009/0271270 A1 | 10/2009 | Regmi et al. | |
| 2009/0292464 A1 | 11/2009 | Fuchs et al. | |
| 2009/0319425 A1 * | 12/2009 | Tumminaro | G06Q 20/108 705/42 |
| 2010/0010918 A1 | 1/2010 | Hunt | |
| 2010/0064259 A1 | 3/2010 | Alexanderovitc et al. | |
| 2010/0067882 A1 | 3/2010 | Axen et al. | |
| 2010/0088753 A1 | 4/2010 | Ayres et al. | |
| 2010/0131414 A1 | 5/2010 | Tame | |
| 2010/0183199 A1 | 7/2010 | Smith et al. | |
| 2010/0205095 A1 * | 8/2010 | Ostrovsky | G06Q 20/04 705/44 |
| 2010/0211445 A1 * | 8/2010 | Bodington | G06Q 30/02 705/14.17 |
| 2010/0231582 A1 | 9/2010 | Turun et al. | |
| 2010/0304806 A1 | 12/2010 | Coleman et al. | |
| 2010/0315417 A1 | 12/2010 | Cho et al. | |
| 2011/0047491 A1 | 2/2011 | Hwang et al. | |
| 2011/0141141 A1 | 6/2011 | Kankainen | |
| 2011/0201414 A1 | 8/2011 | Barclay et al. | |
| 2011/0216935 A1 | 9/2011 | Mays et al. | |
| 2011/0281654 A1 | 11/2011 | Kelly et al. | |
| 2011/0288963 A1 | 11/2011 | Verona | |
| 2012/0027256 A1 | 2/2012 | Kiyohara et al. | |
| 2012/0030108 A1 | 2/2012 | Katina | |
| 2012/0084669 A1 | 4/2012 | Flint et al. | |
| 2012/0173699 A1 | 7/2012 | Niemelä | |
| 2012/0239565 A1 | 9/2012 | Davis et al. | |
| 2012/0330788 A1 | 12/2012 | Ladisch et al. | |
| 2013/0017878 A1 | 1/2013 | Kitreotis | |
| 2013/0087612 A1 | 4/2013 | Locher | |
| 2013/0124690 A1 | 5/2013 | Liebman | |
| 2013/0133048 A1 | 5/2013 | Wyn-Harris | |
| 2013/0218753 A1 | 8/2013 | Oikonomidis | |
| 2014/0047074 A1 | 2/2014 | Chung et al. | |
| 2014/0073384 A1 | 3/2014 | Oikonomidis | |
| 2014/0109186 A1 | 4/2014 | Oikonomidis | |
| 2014/0236932 A1 | 8/2014 | Ikonomov | |
| 2014/0237579 A1 | 8/2014 | Ikonomov | |
| 2014/0244736 A1 | 8/2014 | Oikonomidis | |
| 2014/0298174 A1 | 10/2014 | Ikonomov | |
| 2014/0310616 A1 | 10/2014 | Ikonomov | |
| 2014/0324893 A1 | 10/2014 | Ikonomov | |

FOREIGN PATENT DOCUMENTS

| | | |
|---|---|---|
| EP | 1434459 B1 | 6/2004 |
| EP | 1522920 B1 | 4/2005 |
| JP | H113434 A | 1/1999 |
| JP | 2003168132 A | 6/2003 |
| KR | 10-2003-0043870 A | 6/2003 |
| RU | 2124753 C1 | 1/1999 |
| RU | 2178922 C1 | 1/2002 |
| RU | 2000112271 A | 4/2002 |
| RU | 2248040 C2 | 3/2005 |
| RU | 2253895 C2 | 6/2005 |
| RU | 2255371 C2 | 6/2005 |
| RU | 2279191 C1 | 6/2006 |
| RU | 2291483 C1 | 1/2007 |
| RU | 2305321 C1 | 8/2007 |
| RU | 70018 U1 | 1/2008 |
| RU | 70387 U1 | 1/2008 |
| RU | 2006136310 U1 | 4/2008 |
| RU | 2324220 C2 | 5/2008 |
| RU | 2331913 C2 | 8/2008 |
| RU | 2331918 C2 | 8/2008 |
| RU | 76485 U1 | 9/2008 |
| RU | 82897 U1 | 5/2009 |
| RU | 2363984 C2 | 8/2009 |
| RU | 2378987 C1 | 1/2010 |
| RU | 2391229 C1 | 6/2010 |
| RU | 2391700 C2 | 6/2010 |
| RU | 2403944 C1 | 11/2010 |
| RU | 2009124332 A | 1/2011 |
| RU | 2009126832 A | 1/2011 |
| RU | 2415466 C1 | 3/2011 |
| RU | 105102 U1 | 5/2011 |
| RU | 2419154 C2 | 5/2011 |
| RU | 2419831 C2 | 5/2011 |
| RU | 2419844 C2 | 5/2011 |
| RU | 2419858 C2 | 5/2011 |
| RU | 2427090 C2 | 8/2011 |
| RU | 109891 U1 | 10/2011 |
| RU | 114185 U1 | 3/2012 |
| RU | 2010147838 A | 5/2012 |
| RU | 117201 U1 | 6/2012 |
| RU | 124504 U1 | 1/2013 |
| RU | 125745 U1 | 3/2013 |

(56) References Cited

FOREIGN PATENT DOCUMENTS

| | | |
|---|---|---|
| RU | 137817 U1 | 2/2014 |
| WO | 0028680 A1 | 5/2000 |
| WO | 0106338 A2 | 1/2001 |
| WO | 2004079514 A2 | 9/2004 |
| WO | 2005013153 A1 | 2/2005 |
| WO | 2005040965 A2 | 5/2005 |
| WO | 2006115524 A2 | 11/2006 |
| WO | 2007001628 A2 | 1/2007 |
| WO | 2007100239 A1 | 9/2007 |
| WO | 2007133847 A2 | 11/2007 |
| WO | 2007143106 A2 | 12/2007 |
| WO | 2009131854 A1 | 10/2009 |
| WO | 2009155142 A2 | 12/2009 |
| WO | 2010068781 A1 | 6/2010 |
| WO | 2013058678 A1 | 4/2013 |
| WO | 2013077765 A1 | 5/2013 |
| WO | 2013172742 A1 | 11/2013 |
| WO | 2013180599 A2 | 12/2013 |
| WO | 2013180599 A3 | 12/2013 |
| WO | 2013191592 A1 | 12/2013 |
| WO | 2014007678 A1 | 1/2014 |
| WO | 2014011088 A2 | 1/2014 |
| WO | 2014011088 A3 | 1/2014 |
| WO | 2014042556 A1 | 3/2014 |
| WO | 2014044286 A1 | 3/2014 |
| WO | 2014058349 A1 | 4/2014 |
| WO | 2014074018 A1 | 5/2014 |
| WO | 2014120043 A1 | 8/2014 |
| WO | 2014142706 A1 | 9/2014 |
| WO | 2015009199 A1 | 1/2015 |
| WO | 2015026263 A1 | 2/2015 |
| WO | 2015026264 A1 | 2/2015 |
| WO | 2015041573 A1 | 3/2015 |

OTHER PUBLICATIONS

Office Action dated Sep. 19, 2014 in co-pending U.S. Appl. No. 13/651,440 (US20140109186A1) (21 pages).

Office Action dated Oct. 29, 2013 in co-pending U.S. Appl. No. 13/609,261 (US20140073384A1) (9 pages).

Office Action dated Apr. 5, 2013 in co-pending U.S. Appl. No. 13/399,930 (US20140073384A1) (25 pages).

iCLOUD: Kak naznachit obshchii dostup dlya Photo Stream i podelitsya s druziami Internet-ssylkoi. Novosti iPad, Mar. 20, 2013 [on-line] [retrieved on Dec. 24, 2014]. Retrieved from the Internet: <URL: http://www.ipad3mania.ru/2013/03/20/icloud-kaknaznachit-obshhij-dostup-dlya-photo-stream-i-podelitsya-s-drazyami-internet-ssylkoj/>; w/ English machine translation; cited in ISR of WO2015026263A1 (15 pages).

International Search Report for PCT/RU2013/000828, dated Dec. 26, 2013, and Written Opinion; with partial English translation and machine translation (8 pages).

CNEWS, URL; http://cnews.ru/news/2012/02/14vyhodcy_izrossii_zapustili_novuyu_ambicioznuyu_socset_cafe4tunecom_477575, dated Feb. 14, 2012; with English translation; Cited in ISR of WO2014042556A1 (3 pages).

* cited by examiner

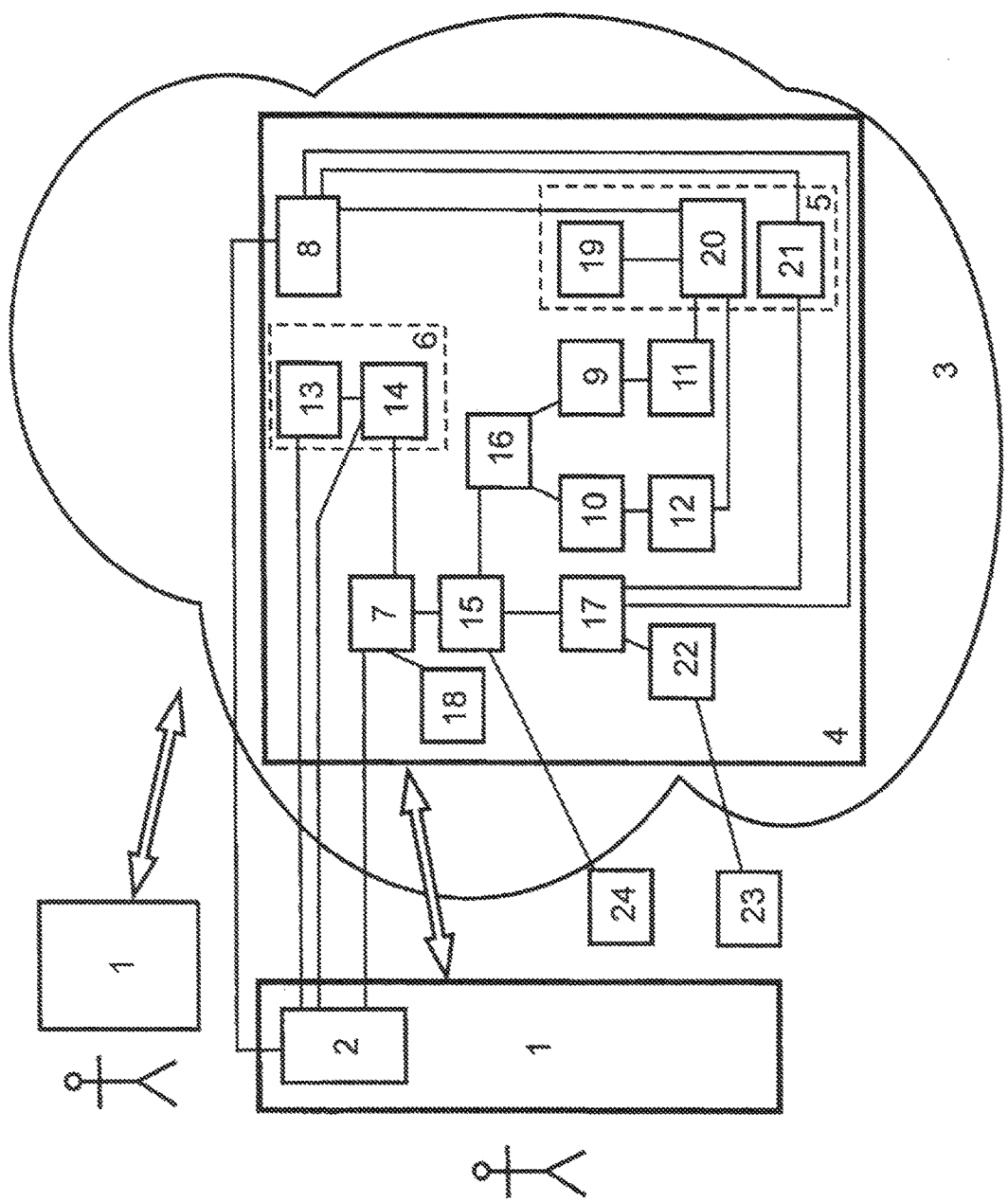

ELECTRONIC PAYMENT SYSTEM

This utility model relates to electronic payment architectures specifically intended for account management systems, and specifically to electronic payment systems which comprise client devices of remote users, including an interface unit for controlling monetary operations and accounts, and are connected to one another with the aid of a unified network, which comprises at least one server comprising, connected to one another, a storage unit for a database of monetary operations and accounts, an authorization and authentication unit, a unit for controlling monetary operations and accounts, and an analysis and statements unit, and can be used by users of computer devices for controlling real and virtual monetary operations and accounts.

A known example of prior art is an electronic payment system which comprises client devices of remote users, including an interface unit for controlling monetary operations and accounts, and are connected to one another with the aid of a unified network, which comprises at least one server comprising, connected to one another, a storage unit for a database of monetary operations and accounts, an authorization and authentication unit, a unit for controlling monetary operations and accounts, as described in the Russian invention patent application No 2010147838, published in 2006.

The above system comprises client devices of remote users represented as a mobile wireless communication device, such as, a cell phone. The unified network is essentially mobile wireless communication. The interface unit for controlling monetary operations and accounts is essentially a data processing device. The authorization and authentication unit is essentially a device comprising an encryption key to decipher financial data.

The drawback of the above electronic payment system is its limited capabilities, namely, that it does not provide an option for account creation and servicing in real and virtual currencies.

Another example of prior art is an electronic payment system which comprises client devices of remote users, including an interface unit for controlling monetary operations and accounts, and are connected to one another with the aid of a unified network, which comprises at least one server comprising, connected to one another, a storage unit for a database of monetary operations and accounts, an authorization and authentication unit, a unit for controlling monetary operations and accounts, and an analysis and statements unit, as described in the Russian utility model patent No 76485, published in 2008.

The above system includes a server comprising the following interconnected units: a storage unit for a database of monetary operations and accounts, an authorization and authentication unit, a unit for controlling monetary operations and accounts, and an analysis and statements unit, which is essentially a Database Server which function it is to perform authentication of the parameters of multipurpose debit and credit payment cards, both in the process of activation and already activated, authorize transactions, register and control the balance status of the electronic payment system users, generate and register information/payment documents presented to the electronic payment system users.

The above system is used herein as a prototype of the utility model claimed.

The drawback of the above electronic payment system is its limited capabilities, namely, that it does not provide an option for account creation and servicing in real and virtual currencies.

The present utility model relies on this novel observation with the primary aim to offer an electronic payment system that serves at least to mitigate the aforementioned drawback, namely, to provide an option for account creation and servicing in real and virtual currencies, thereby extending the possibilities of the system.

For this purpose, the electronic payment system additionally comprises a unit for creating and keeping an account in real monetary units and a unit for creating and keeping an account in virtual monetary units, which units are connected to the unit for controlling monetary operations and accounts and to the storage unit for a database of monetary operations and accounts.

The above makes it possible to create and keep accounts in real and virtual monetary units, to realize accounts creation in real monetary units based on real bank (credit) accounts, to perform operations with said accounts in real and virtual monetary units (money transfers, credits to the accounts and so on), to perform operations with said accounts both from computers and from mobile user devices, to ensure that all payment operations are supported from a single interface installed on mobile and desktop devices, which serves to expand the possibilities of the system.

A version of the utility model includes a unit for creating and keeping an account in real monetary units which comprises a conversion and cross rate unit.

The above makes it possible to create and keep accounts in various currencies and convert funds from one currency to another.

Another version of the utility model includes a unit for creating and keeping an account in virtual monetary units which comprises a gold equivalent keeping and conversion unit.

The above makes it possible to create and keep accounts in virtual monetary units and to convert them to real monetary units by setting the same equal to the gold equivalent, as well as to create accounts in an internal currency based on the gold equivalent and manipulate virtual and real funds using a single set of rules with an option to convert virtual money to real money and vice versa based on a cross rate system.

The combination of the essential features of the claimed utility model is not known from the prior art for devices having similar purpose, consequently, it is possible to conclude that the utility model possesses the required feature of novelty.

Other distinguishing features and advantages of the utility model are readily apparent from the description below which includes but is not limited to the following features, with reference to the FIGURE attached:

FIG. 1 is a functional diagram of the electronic payment system according to the utility model.

The electronic payment system (See FIG. 1), which comprises client devices 1 of remote users, including an interface unit for controlling monetary operations and accounts 2, and are connected to one another with the aid of a unified network 3, which comprises at least one server 4 comprising, connected to one another, a storage unit for a database of monetary operations and accounts 5, an authorization and authentication unit 6, a unit for controlling monetary operations and accounts 7, and an analysis and statements unit 8. The electronic payment system additionally comprises a unit for creating and keeping an account in real monetary units 9 and a unit for creating and keeping an account in virtual monetary units 10, which units are connected to the unit for controlling monetary operations and accounts 7 and to the storage unit for a database of monetary operations and accounts 5.

The unit for creating and keeping an account in real monetary units 9 comprises a conversion and cross rate unit 11.

The unit for creating and keeping an account in virtual monetary units 10 comprises a gold equivalent keeping and conversion unit 12.

The electronic payment system uses a virtual monetary unit and a virtual bank with the gold equivalent (guarantee) to back commercial operations. Such monetary unit essentially provides the users of the electronic payment system with gold-guaranteed money, which is, evidently, a more secure method for keeping of funds.

The virtual money system option makes it possible for the users of the electronic payment system to perform virtual and real commercial operations (sale and purchase of virtual and actual property, services, etc). For this purpose the virtual bank of the electronic payment system is an issuing center of the financial system having all features of real banks.

A notion of the virtual monetary unit (VMU) must be introduced. VMU is the equivalent of 0.01 grams of gold. The cost of 0.01 grams of gold is determined according to the price of gold on appointed in advance one of international exchanges where trading in gold takes place. The initial monetary equivalent is the currency used to trade in gold. The equivalent in other currencies is calculated using relevant cross rates applicable to the target currency and the currency used to evaluate gold in the appointed exchange.

The sole issuing center, which is the virtual commercial bank, is responsible for the original and all later issues of virtual monetary units. The scope and term of the original issue is defined by the administration of the social network introducing the virtual monetary system pursuant to the applicable law and legal instruments.

Actual gold equivalent guarantee of the original issue is regulated by Virtual Bank and Original Issue Memorandum.

All operations with virtual money are kept in the analytical balance sheet of the virtual bank based on the international chart of accounts.

In addition to the accounts in virtual monetary unit, the electronic payment system makes it possible to create accounts in various real currencies. These accounts are not gold-guaranteed and function as a traditional electronic form for various electronic payments and financial savings.

The users of the electronic payment system are provided an option to create virtual "wallets" with procedural opportunities to process virtual sales and purchases, a virtual and real money receipt for a particular form of resource provision.

Virtual users "wallets" are represented as accounts in the analytical balance sheet of the virtual bank. Operations involving "wallets" are represented as accepted balance postings in the system of banking accounting in the analytical balance sheet of the virtual bank.

The authorization and authentication unit 6 may additionally include an integrated authentication and authorization unit 13 and an alert and response unit 14.

In addition to the unit for controlling monetary operations and accounts 7, the electronic payment system may include a unit for controlling wallets and electronic cards 15, a unit for controlling internal accounts 16, a unit for controlling credit cards 17, a unit for controlling cash information 18.

The storage unit for a database of monetary operations and accounts 5 may comprise a storage unit for a database of monetary operations accounting 19, a storage unit for a database of internal accounts 20, a storage unit for a database of credit card accounting 21.

The unit for controlling monetary operations and accounts 7 verifies the conditions of the monetary operation involving credit cards or electronic wallets and, if the conditions are met, the unit for controlling monetary operations and accounts 7 initiates monetary operations support procedures. Monetary operation procedures are performed using the unit for controlling wallets and electronic cards 15. For instance, the unit for controlling wallets and electronic cards 15 is used by said procedures to check availability of funds on credit card and electronic wallet accounts.

If the conditions for the operation are not met or the operation was aborted by banking systems, the unit for controlling monetary operations and accounts 7 initiates a user notification process by the interface unit for controlling monetary operations and accounts 2.

In all cases the interface unit for controlling monetary operations and accounts 7 stores the information on the operation performed or operation attempts in the storage unit for a database of monetary operations accounting 19.

If a payment operation is successfully completed, the unit for controlling cash information 18 is initialized to send the information on the operation performed to the institution awaiting the cash confirmation of payment.

The unit for controlling wallets and electronic cards 15 integrates the management of credit card and electronic wallet information posting and deletion, monitors all accounts to ensure that they are kept and used correctly. Management integration is required for said unit 15 to finalize transactions between users' credit cards and electronic wallets.

The unit for controlling internal accounts 16 and the unit for controlling credit cards 17 are designed for direct management of credit card accounts and electronic wallet accounts.

The unit for controlling credit cards 17 is in charge of direct recording and deletion of user-defined credit card descriptors, delimiting access to the same, monitoring status of said cards with the banks by means of a remote user support software (which are provided by banks and other organizations in accordance with laws and regulations applicable to banking), initiates direct operations with credit cards by banking systems through remote user support modules.

For this purpose, banking systems are sent the codes of the institutions awaiting successful payment confirmation when finalizing payment transactions. In such cases banking systems are in charge of informing such institutions of payments completed.

The unit for controlling internal accounts 16 is in charge of creation and deletion of internal system accounts in the framework of the virtual financial system, delimiting access to the same, analysis of account status, etc. The unit for creating and keeping an account in virtual monetary units 10 is in charge of direct creation and deletion of accounts in virtual monetary units and is activated to store account description and attributes by transmitting the signal to the storage unit for a database of internal accounts 20 and to mark the initial account status, namely, to check if funds are transferred to the account, if it is gold-guaranteed, and, if not, to generate information transmissions to system administrators to provide such gold guarantee. The account is activated as soon as the gold guarantee for this account is registered in the system.

The gold equivalent keeping and conversion unit 12 is in charge of account operations and conversion of virtual monetary units into real monetary units and vice versa and is activated to form a set of money and gold equivalents of virtual monetary units through the clearing system. The key task of the gold equivalent keeping and conversion unit 12 is to support gold equivalent guarantee for the given type of accounts.

The unit for creating and keeping an account in real monetary units 9 is designed for direct creation of an internal account in real monetary units of a certain currency and serves to create an internal monetary account with all required descriptors and attributes which are stored in the database of internal accounts. The unit monitors the initial status of the account, namely, if money is transferred to the account. The account is activated as soon as the user transfers funds in the chosen currency to the account (by usual bank payment).

The conversion and cross rate unit 11 is designed to performed payment, transfer and crediting transactions in various currencies and in virtual monetary units.

The unit for controlling internal accounts 16 and the unit for controlling credit cards 17 interact when operations involving credit cards and internal accounts are performed simultaneously, for instance, in case of money transfer from the internal account to the credit card account and vice versa, user-sanctioned credit card payment by transferring money to the same from internal virtual accounts.

The analysis and statements unit 8 provides balance reports, cashflow reports, payment reports, etc, to the users and the administration. The reporting is based on the information in the databases of internal accounts, credit card accounting, operations accounting. In addition to that, in order to receive standard bank reports, the analysis and statements unit 8 sends a signal to the unit for controlling credit cards 17, which, in turn, makes the relevant request to the banking system through remote user support modules.

In general, any variety of computing platforms that can be connected to a network such as a combined network and can interact with applications can be a client device 1. Standard examples of some such client devices include but are not limited to desktop and laptop personal computers, smart cellular phones (smartphones), lightweight clients, workstations, "non-intelligent" terminals connected to the application server and various combinations and configurations of the same that are self-evident for those skilled in the art, i.e. these include both physical devices that ensure interaction as part of communication and virtual devices based on programmable computers and having program interface to enable such communication.

The combined network 5 and all connections between all modules and units comprise a multitude of topologies, configurations and arrangements of the internetworking components built so as to connect corporate, global and local computer networks. Such network includes but is not limited to traditional wired and wireless, satellite, optical and equivalent networking technology that are self-evident for those skilled in the art.

The electronic payment system functions as follows. The user of the electronic payment system connects the client device 1 through the unified network 3 to the server 4. For this purpose, the interface unit for controlling monetary operations and accounts 2 provides access to all financial resources created within and outside of the electronic payment system (credit cards, accounts created in the real banking environment).

The interface unit for controlling monetary operations and accounts 2 is in charge of the following:

1) creation of electronic wallets based on the virtual money of the electronic payment system and in real currencies;

2) input of the user's own credit cards and authorized access codes for the same for the purpose of future payments and other credit card transactions;

3) activation of the list of electronic wallets created in the electronic payment system for the purpose of transactions involving virtual money;

4) activation of the list of credit cards for the purpose of transactions using funds available on said credit cards (or accounts thereof).

Transactions with virtual money in electronic wallets include but are not limited to:

1) crediting of virtual money on electronic wallet accounts by clearing and conversion of real money from real credit cards;

2) crediting of real money on electronic wallet accounts by conversion of virtual money from electronic wallet accounts or by direct transfer from standard internal accounts of funds in currencies in accordance with the cross rates specified;

3) payments for goods and services (within or outside of the system) from electronic wallets;

4) payments for goods and services (within or outside of the system) from credit cards.

The user is allowed to access the credit card or electronic wallet after the activation of the integrated authentication and authorization unit 13, the latter being supported by the processes of face recognition, voice recognition, password or key phrase input, iris or fingerprint identification and other identification methods.

The procedure of credit card or electronic wallet selection and activation by password is mandatory. All other identification and authorization procedures are selected and applied by the user.

The integrated authentication and authorization unit 13 activates all identification procedures assigned by the user one at a time. The user can access the credit card or electronic wallet account if all procedures verify the user's identity.

A procedure may be initialized multiple times in the event of user errors or ambiguous recognition results.

If the sequence of identification and authorization procedures yields a negative result, the integrated authentication and authorization unit 13 activates the alert and response unit 14, which, in turn, activates the unit for controlling monetary operations and accounts 7 and sends a notification of an unauthorized access attempt with an option to block the transaction system. The unit for controlling monetary operations and accounts 7 blocks the whole of the electronic payment system which remains blocked until the access recovery procedure is completed.

In this case the interface unit for controlling monetary operations and accounts 2 informs the user of the electronic payment system blocking, causes, date/time of the same and suggests recovering the access to the electronic payment system. Access to the electronic payment system is recovered using the password from the interface unit for controlling monetary operations and accounts 2.

The "Virtual Bank/User" relationship takes the following form.

The user of the electronic payment system is given the opportunity to create a "Virtual Walllet" with reference to the user's registration data with the following procedure: the user transfers real money in the user-defined currency to the organization account; as soon as the money are received, the administration opens an account in the name of the user with the virtual bank, converts the funds received to to the virtual monetary units and debits the equivalent to the user's account. If funds are transferred to the accounts in real currencies, such funds are debited to the respective accounts in the system.

Real money are converted to virtual monetary units as follows: the amount is converted to the currency normally used to evaluate gold in the international exchange appointed by the virtual bank according to the cross rate, then the amount so converted is used to determine the amount of gold that can be bought in said exchange, then the amount of virtual monetary units equivalent to the above amount of gold is determined to 0.01, i.e. 3.05 VMU is equivalent to 0.0305 grams of gold.

Each user of the electronic payment system can view the balance of the "Virtual Wallet" and reports on all cash flow on their account in the Virtual Bank at any time.

Each user payment and account crediting as well as all withdrawals are complemented by standard bank postings.

The virtual bank is supported by its own banking day system, reporting and analysis system, including aggregate balance sheet, bank's turnover balance, etc. Monetary operations with the user per se (withdrawal of real money, payment of real money) can be performed through affiliated commercial banks or by a standard clearing system using accounts with any bank.

Withdrawals and savings on VMU accounts are complemented by reduction and increase of the amount of gold (gold equivalent), respectively. The electronic payment system enables all kinds of transfers and conversions from one account to the other, including from a VMU account to an account in a real currency and vice versa. Electronic payment system software and its administration support subsystems of providing loans to the users in virtual money and depositing user funds in virtual monetary units.

Loans are extended to the users of the electronic payment system pursuant to the legal instruments in an electronic and paper-based format.

If there is a security component, both real material property and virtual funds, if any, of the user may be used as collateral for the purpose of loan extension. User collateral (pledged property) must be supported by legal instruments and appraised in virtual monetary units.

The collateral system may be limited by real property only or virtual property only.

User funds may be deposited pursuant to an agreement if appraised in virtual monetary units.

The electronic payment system of the virtual bank operational day has all the characteristic features of real operational day systems, namely:

1) utilities for the creation of financial orders (payment orders, memo orders, etc);

2) utilities for the performance of financial operations and registration of the same in the analytical balance sheet of the virtual bank;

3) utilities for the financial operations control;

4) utilities for the generation of reports;

5) utilities for the analysis of the virtual bank performance;

6) utilities for archiving all accounting information;

7) information protection utilities.

The electronic payment system may comprise a real payment subsystem to manage credit card accounts in a number of banking organization at the same time.

Said subsystem enables input of credit card attributes, attribute coding and guaranteed safety. In addition to that, the subsystem enables selection of the required credit card, payment from the credit card or transfer of funds to the account. Transfers of funds from one credit card account to another credit card account, from an internal monetary system account (virtual wallet) to the real credit card account and vice versa—from the credit card account to the virtual wallet account are also supported. Such transfers are made in accordance with the rules and equivalents for conversion of a virtual monetary unit to the real monetary unit.

Crediting of funds to the real credit card follows general rules and is performed using generally approved devices (except transfers from virtual money wallets).

Payments from credit cards are initiated on the user's side through the electronic payment system interface.

Access to the credit card payment system is controlled by the authorization and authentication unit 6 which can initialize, for instance, the system of face recognition, voice recognition, password or key phrase input, iris or fingerprint identification and other means. Identification methods, except mandatory ones, are user-defined.

The user selects a credit card account from the list of all cards (and accounts of the same) as introduced in the electronic payment system. Each credit card (account) can be selected with the input of a dedicated password (code).

Having specified the card (account), the user selects the payment operation from the list of credit card (account) operations. Then the user specifies the number of the device capable of receiving payment confirmation (institution account crediting conformation) in a predefined format. Such devices may be credit card reading devices (devices installed in the cashdesk of the payment recipient), computers and any other device generally accepted for electronic payment of all types.

Using the interface tools to indicate the amount of payment and additional information (code of goods or services paid, code of payment recipient, etc), if applicable, the user, as soon as the payment function is confirmed, initializes payment through the server 4 of the electronic payment system.

The server of the electronic payment system performs payment from the user-defined credit card following standard procedures applicable to credit card payments except payment confirmation function which is used to confirm payment or send a notification about the payment to the device, the code of which has previously been saved by the user and transmitted to the system server in the general payment information package. The system server, in turn, transmits the device code for payment confirmation purposes to the banking system responsible for credit card operations.

Real operations with credit cards are registered in the system database in a dedicated format regardless of whether they are registered in banking systems; for this purpose the signal is sent to the database of monetary operations and accounts 5.

The user of the electronic payment system can receive reports both from the credit card support system of the issuing bank and from the system database. It stands to reason that such reports can have discrepancies, as the user reserves the opportunity to perform operations with banking cards outside of the system using traditional procedures.

An electronic payment system in the environment of the Cafe4tune social network has been made in accordance with the utility model claimed. Trial runs of said electronic payment system demonstrated that it enables the following:

creation of accounts in real monetary units;
creation of accounts in virtual monetary units;
creation of accounts in internal currency based on gold equivalent;
manipulations with virtual and real funds using a single set of rules with an option to convert virtual money to real money and vice versa based on a cross rate system;
accounting in real monetary units;
accounting in virtual monetary units;
creation of accounts in real monetary units based on real bank (credit) accounts;
operations with accounts in real monetary units (money transfers, crediting, etc);
operations with accounts in virtual monetary units (money transfers, crediting, etc);
operations with accounts both from desktop and mobile user devices;
support of all payment operations from a single interface installed on mobile and desktop devices;
use mobile user devices to perform operations with accounts as well as with credit cards, for instance, for the purpose of payments in real stores;
total integration in a single electronic payment system.
storage of information on credit cards, check books and other methods of (real) funds depositing in a conventional banking system and the user-provided information by the system interface tools;
integrated multilevel identification and authorization system for access to funds.

In addition to that, the electronic payment system solves many problems related to the safety of operations with user funds. For instance, known safety issues related to credit card operations are resolved by the claimed electronic payment system as follows:

1. The user device stores no real information that might refer to credit cards—only user-defined card names are stored.

2. Multilevel identification and authorization system is required for access to the credit card operations unit: to get access, the user of the electronic payment system will have to pass a combination of such procedures as iris, face, voice, fingerprint recognition, key phrase input, etc.

3. All identification system is built so as to eliminate static nature of the identification information (for instance, elimination of the loophole wherein a user could insert a photo during face or iris recognition, elimination of code stealing attempts followed by unauthorized stealth software installation, etc).

4. All credit card operations are performed by functional servers closed for system users and external intrusion.

Such multilevel identification and authorization approach is applied to all types of user funds storage in the electronic payment system.

The above features ultimately extend the possibilities of the electronic payment system.

The invention claimed is:

1. Electronic payment system comprising client devices of remote users, each including an interface unit for controlling monetary operations and accounts, and connected to one another with the aid of a unified network,
wherein said network comprises at least one server comprising, connected to one another:
a storage unit for a database of monetary operations and accounts,
an authorization and authentication unit,
a unit for controlling monetary operations and accounts, and
an analysis and statements unit,
wherein said electronic payment system additionally comprises:
a unit for creating and keeping an account in real monetary units, and
a unit for creating and keeping an account in virtual monetary units,
said units for creating and keeping an account in real monetary units and for creating and keeping an account in virtual monetary units being connected:
to the unit for controlling monetary operations and accounts, and
to the storage unit for a database of monetary operations and accounts,
wherein the server also comprises:
a unit for controlling wallets and electronic cards,
a unit for controlling internal accounts,
a unit for controlling credit cards,
a unit for controlling cash information,
said units being connected to the unit for controlling monetary operations and accounts,
wherein at least one selected from the group consisting of:
(i) the unit for controlling wallets and electronic cards is adapted:
to integrate the management of credit card and virtual wallet information posting and deletion,
to monitor all accounts to ensure that they are kept and used correctly,
(ii) both, the unit for controlling internal accounts and unit for controlling credit cards, are designed for direct management of virtual wallet accounts and credit card accounts, and
(iii) the analysis and statements unit is adapted to provide balance reports, cashflow reports, payment reports, and the analysis and statements unit is adapted to send a signal to the unit for controlling credit cards in order to receive bank reports.

2. The electronic payment system according to claim 1, wherein the unit for creating and keeping an account in real monetary units comprises a conversion and cross rate unit adapted to perform payment, transfer and crediting transactions in currencies and in virtual monetary units.

3. The electronic payment system according to claim 1, wherein the unit for creating and keeping an account in virtual monetary units comprises a gold equivalent keeping and conversion unit adapted to support gold equivalent guarantee for the accounts in virtual monetary units.

4. The electronic payment system according to claim 1, wherein the authorization and authentication unit comprises:
an integrated authentication and authorization unit and
an alert and response unit.

5. The electronic payment system according to claim 1, wherein the unit for controlling monetary operations and accounts comprises:
a storage unit for a database of monetary operations accounting,
a storage unit for a database of internal accounts, and
a storage unit for a database of credit card accounting.

6. The electronic payment system according to claim 1, wherein the unit for controlling wallets and electronic cards is adapted:

to integrate the management of credit card and virtual wallet information posting and deletion, to monitor all accounts to ensure that they are kept and used correctly.

7. The electronic payment system according to claim 1, wherein both, the unit for controlling internal accounts and unit for controlling credit cards, are designed for direct management of virtual wallet accounts and credit card accounts.

8. The electronic payment system according to claim 7, wherein the unit for controlling credit cards is adapted to:
   direct recording and deletion of user-defined credit card descriptors,
   delimiting access to the user-defined credit card descriptors,
   monitoring status of said cards, and
   initiating direct operations with credit cards through remote user support modules.

9. The electronic payment system according to claim 7, wherein the unit for controlling internal accounts is adapted:
   to create and to delete of internal system accounts,
   to delimit access to the internal system accounts,
   to analyze of account status.

10. The electronic payment system according to claim 1, wherein the analysis and statements unit is adapted to provide balance reports, cashflow reports, payment reports, and wherein the analysis and statements unit is adapted to send a signal to the unit for controlling credit cards in order to receive bank reports.

11. The electronic payment system according to claim 1, wherein it comprises also a real payment subsystem adapted to manage credit card accounts at the same time.

12. The electronic payment system according to claim 11, wherein the real payment subsystem enables input of credit card attributes, attribute coding and guaranteed safety.

13. The electronic payment system according to claim 12, wherein the real payment subsystem enables also selection of the required credit card, payment from the credit card or transfer of funds to the account.

14. The electronic payment system according to claim 13, wherein the real payment subsystem is adapted to support transfers of funds from one credit card account to another credit card account, from a virtual wallet account to the real credit card account and vice versa.

15. Electronic payment system according to claim 3, comprising client devices of remote users, each including an interface unit for controlling monetary operations and accounts, and connected to one another with the aid of a unified network,
   wherein said network comprises at least one server comprising, connected to one another:
   a storage unit for a database of monetary operations and accounts,
   an authorization and authentication unit,
   a unit for controlling monetary operations and accounts, and
   an analysis and statements unit,
   wherein said electronic payment system additionally comprises:
   a unit for creating and keeping an account in real monetary units, and
   a unit for creating and keeping an account in virtual monetary units,
   said units for creating and keeping an account in real monetary units and for creating and k an account in virtual monetary units being connected:
   to the unit for controlling monetary operations and accounts, and
   to the storage unit for a database of monetary operations and accounts,
   wherein the unit for creating and keeping an account in virtual monetary units comprises a gold equivalent keeping and conversion unit adapted to support gold equivalent guarantee for the accounts in virtual monetary units,
   wherein the virtual monetary unit is equal to 0.01 grams of gold.

16. Electronic payment system comprising client devices of remote users, each including an interface unit for controlling monetary operations and accounts, and connected to one another with the aid of a unified network,
   wherein said network comprises at least one server comprising, connected to one another:
   a storage unit for a database of monetary operations and accounts,
   an authorization and authentication unit,
   a unit for controlling monetary operations and accounts, and
   an analysis and statements unit,
   wherein said electronic payment system additionally comprises:
   a unit for creating and keeping an account in real monetary units, and
   a unit for creating and keeping an account in virtual monetary units,
   said units for creating and keeping an account in real monetary units and for creating and keeping an account in virtual monetary units being connected:
   to the unit for controlling monetary operations and accounts, and
   to the storage unit for a database of monetary operations acrd accounts,
   wherein the unit for controlling monetary operations and accounts comprises:
   a storage unit for a database of monetary operations accounting,
   a storage unit for a database of internal accounts, and
   a storage unit for a database of credit card accounting,
   wherein at least one selected from the group consisting of:
   (i) the unit for creating and keeping an account in virtual monetary units is adapted:
   to create and to delete of accounts in virtual monetary units,
   to store account description and attributes by transmitting a signal to the storage unit for a database of internal accounts,
   to mark the initial account status, and
   (ii) the unit for creating and keeping an account n real monetary units is adapted:
   to create and to delete of accounts in real monetary units,
   to store account description and attributes to the storage unit for a database of internal accounts,
   to mark the initial account status.

17. The electronic payment system according to claim 16, wherein the unit for creating and keeping an account in real monetary units is adapted:
   to create and to delete of accounts in real monetary units,
   to store account description and attributes to the storage unit for a database of internal accounts,
   to mark the initial account status.

18. The electronic payment system according to claim 16, wherein the unit for creating and keeping an account in virtual monetary units is adapted:

to create and to delete of accounts in virtual monetary units, to store account description and attributes by transmitting a signal to the storage unit for a database of internal accounts, to mark the initial account status.

19. Electronic payment system comprising client devices of remote users, each including an interface unit for controlling monetary operations and accounts, and connected to one another with the aid of a unified network, wherein said network comprises at least one server comprising, connected to one another:

a storage unit for a database of monetary operations and accounts, an authorization and authentication unit, a unit for controlling monetary operations and accounts, and an analysis and statements unit, wherein said electronic payment system additionally comprises:

a unit for creating and keeping an account in real monetary units, and a unit for creating and keeping an account in virtual monetary units, said units for creating and keeping an account in real monetary units and for creating and keeping an account in virtual monetary units being connected:

to the unit for controlling monetary operations and accounts, and to the storage unit for a database of monetary operations and accounts, wherein the authorization and authentication unit comprises:

an integrated authentication and authorization unit and an alert and response unit, wherein the integrated authentication and authorization unit is adapted to activate user's identification procedures, the access to a credit card or a virtual wallet account being authorized only if user's identification procedures yield unambiguous recognition results.

20. The electronic payment system according to claim 19, wherein the integrated authentication and authorization unit is adapted to activate the alert and response unit if user's identification procedures yield ambiguous recognition results, and wherein the alert and response unit is adapted:

to activate the unit for controlling monetary operations and accounts and to send a notification of an unauthorized access attempt with an option to block the electronic payment system.

* * * * *